(12) United States Patent
Kiefer et al.

(10) Patent No.: US 11,009,856 B2
(45) Date of Patent: May 18, 2021

(54) SORTING SUPPORT METHOD AND FLATBED MACHINE TOOL

(71) Applicant: TRUMPF Werkzeugmaschinen GmbH + Co. KG, Ditzingen (DE)

(72) Inventors: Manuel Kiefer, Sinsheim (DE); Jens Ottnad, Karlsruhe (DE); Eberhard Wahl, Weilheim an der Teck (DE); Korbinian Weiss, Stuttgart (DE); Benjamin Schwarz, Muenchingen (DE); Philipp Springer, Stuttgart (DE); Matthias Denecke, Bautzen (DE); David Schoene, Schoenteichen (DE); Stefan Krause, Wilthen (DE); Falko Keimel, Bischofswerda (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 142 days.

(21) Appl. No.: 16/387,745

(22) Filed: Apr. 18, 2019

(65) Prior Publication Data

US 2019/0243343 A1     Aug. 8, 2019

Related U.S. Application Data

(63) Continuation of application No. PCT/EP2017/076867, filed on Oct. 20, 2017.

(30) Foreign Application Priority Data

Oct. 21, 2016   (DE) .......................... 102016120131.6

(51) Int. Cl.
*G06F 7/00* (2006.01)
*G05B 19/418* (2006.01)
(Continued)

(52) U.S. Cl.
CPC .......... *G05B 19/4183* (2013.01); *B23Q 7/12* (2013.01); *B26D 5/007* (2013.01); *G05B 19/401* (2013.01);
(Continued)

(58) Field of Classification Search
CPC .......... G05B 19/4183; G05B 19/40935; G05B 19/401; G05B 2219/36167;
(Continued)

(56) References Cited

U.S. PATENT DOCUMENTS 5,794,789 A    8/1998   Payson
9,126,423 B2*  9/2015   Costin, Sr. ................ B41J 3/42
(Continued)

FOREIGN PATENT DOCUMENTS

CN    102056822 A    5/2011
CN    103287777 A    9/2013
(Continued)

OTHER PUBLICATIONS

DE Office Action in German Appln. No. 102016120132.4, dated Jan. 22, 2018, 17 pages (with English translation).
(Continued)

*Primary Examiner* — Yolanda R Cumbess
(74) *Attorney, Agent, or Firm* — Fish & Richardson P.C.

(57) ABSTRACT

A method for supporting a sorting process of workpieces arranged on a sorting table that have been produced on a machine tool by a processing plan, comprising providing of a processing image data set of the processing plan based on the arrangement of at least one workpiece. The method further relates to an imaging-based capturing of the sorting table having a plurality of adjacent workpieces to each other and generating a first sorting image data set, and repeated image-based capturing of the sorting table and generating of a second sorting image data set once at least one workpiece
(Continued)

has been removed from the sorting table. The method comprises comparing of the sorting image data sets, incorporating the processing image data set, wherein a sorting signal is generated which contains information that comprises the type, the position and/or the shape of the at least one removed workpiece.

25 Claims, 4 Drawing Sheets

(51) Int. Cl.
    *B26D 5/00*     (2006.01)
    *G05B 19/401*     (2006.01)
    *B23Q 7/12*     (2006.01)
    *G05B 19/4093*     (2006.01)

(52) U.S. Cl.
    CPC .................. *G05B 19/40935* (2013.01); *G05B 2219/36167* (2013.01); *G05B 2219/45047* (2013.01)

(58) Field of Classification Search
    CPC ............ G05B 2219/45047; B23Q 7/12; B26D 5/007; Y02P 90/02
    USPC ......... 700/213–215, 218–219, 223–224, 228
    See application file for complete search history.

(56) References Cited

U.S. PATENT DOCUMENTS

| | | | |
|---|---|---|---|
| 2006/0104479 A1 | 5/2006 | Bonch-Osmolovskiy et al. | |
| 2010/0121480 A1 | 5/2010 | Stelzer et al. | |
| 2010/0272961 A1* | 10/2010 | Costin, Jr. .............. | G05B 13/00 428/156 |
| 2011/0035045 A1 | 2/2011 | Walter | |
| 2013/0226643 A1 | 8/2013 | Sakaue et al. | |
| 2013/0249943 A1 | 9/2013 | Chen | |
| 2013/0312371 A1 | 11/2013 | Ambrose | |
| 2015/0081090 A1 | 3/2015 | Dong | |
| 2016/0107468 A1* | 4/2016 | Leynadier ............ | B41J 11/0085 347/16 |
| 2016/0154395 A1 | 6/2016 | Llanos | |

FOREIGN PATENT DOCUMENTS

| | | |
|---|---|---|
| CN | 103793712 A | 5/2014 |
| CN | 104528244 A | 4/2015 |
| DE | 102008018436 | 10/2009 |
| DE | 102011054360 | 4/2013 |
| DE | 102014211353 | 12/2015 |
| DE | 102016104663 | 9/2017 |
| EP | 0928641 | 7/1999 |
| EP | 1524063 | 4/2005 |
| EP | 1487616 | 6/2010 |
| EP | 2161219 | 11/2011 |
| JP | 2011-073876 A | 4/2011 |
| JP | 2013243273 | 12/2013 |
| JP | 2014088234 A | 5/2014 |
| WO | WO 2014/028959 | 2/2014 |

OTHER PUBLICATIONS

DE Office Action in German Appln. No. 102016120131.6, dated Apr. 30, 2019, 13 pages (with English translation).
PCT International Search Report and Written Opinion in International Appln. No. PCT/EP2017/076867, dated Feb. 21, 2018, 19 pages.
PCT International Search Report in International Appln. No. PCT/EP2018/072863, dated Jan. 2, 2019, 9 pages (with English translation).
PCT International Preliminary Report on Patentability in International Appln. No. PCT/EP2017/076867, dated Apr. 23, 2019, 14 pages.
CN Office Action in Chinese Appln. No. 201780064973.3, dated Sep. 24, 2020, 10 pages (with English translation).
JP Japanese Office Action in Japanese Appln. No. 2019-521088, dated Mar. 16, 2021, 6 pages (with English translation).

* cited by examiner

SORTING SUPPORT METHOD AND FLATBED MACHINE TOOL

CROSS REFERENCE TO RELATED APPLICATIONS

This application is a continuation of and claims priority under 35 U.S.C. § 120 from PCT Application No. PCT/EP2017/076867, filed on Oct. 20, 2017, which claims priority from German Application No. 10 2016 120 131.6, filed on Oct. 21, 2016. The entire contents of each of these priority applications are incorporated herein by reference.

TECHNICAL FIELD

The present disclosure relates to methods for supporting the sorting process of workpieces produced with a flatbed machine tool, and further relates to flatbed machine tools and workpiece collecting point units.

BACKGROUND

When sorting parts at machine tools, in particular laser cut material or punched workpieces, in particular sheet metal parts, an operator usually visually compares each individual cut part with a drawing of an order of the respective part. Such a mostly paper-based sorting requires an individual search for a special finished part and its assignment to the correct order, so that a corresponding further processing can be initiated. After the processing process, cut or stamped sheet metal parts are often made available to the respective downstream production step in a group. If, in particular, many different part forms are cut, the visual comparison becomes time-consuming and prone to errors. For example, a large variety of parts can cause problems during part recognition and subsequent sorting to, for example, order-specific workpiece collecting point units. If parts are placed incorrectly, a subsequent process can be adversely affected.

EP 1 524 063 A1 discloses a process for marking workpieces in which a sheet is cut or punched. A projector projects different optical markings onto the cut or punched workpieces. This procedure is intended to simplify the sorting of the workpieces for the operator by displaying the workpieces and to provide a process control procedure for the further processing or further use of such cut or punched workpieces. When workpieces are very small, as it is often the case in sheet metal processing, the markings may become difficult to recognize, so that operators also fall back to paper-based sorting.

In the field of logistics, various procedures support workers. For example, WO 2014/028959 A1 discloses a camera-assisted procedure to assist a worker at installations for manipulating goods, EP 1 487 616 B1 discloses a procedure for automatic process control with detecting a work environment, and EP 2 161 219 B1 and DE 10 2014 211353 A1 disclose procedures for visual supporting manual picking operations. Pick-by-Light implementations are also examples of a digitally supported picking process.

SUMMARY

One aspect of this disclosure is based on the objective of facilitating allocation, reducing errors when allocating, and/or enabling subsequent processes to be carried out efficiently.

In an aspect, the disclosure provides methods for supporting a sorting process of workpieces that are arranged on a sorting table and have been produced with a processing plan using a flatbed machine tool, in particular a laser cutting or punching flatbed machine tool, that include the following steps:

providing a processing image data set of the processing plan on which the arrangement of at least one workpiece was based;

imaging based detecting of the sorting table with a plurality of workpieces arranged spatially next to one another and generation of a first sorting image data set;

repeated imaging of the sorting table, and generating a second sorting image data set after at least one workpiece of the plurality of workpieces arranged spatially next to one another has been removed from the sorting table; and comparing the first sorting image data set and the second sorting image data set including the processing image data set, wherein a sorting signal is generated, which contains information which includes the type, the position, and/or the shape of the at least one removed workpiece.

A further aspect includes methods for retrofitting a flatbed machine tool installation having at least one flatbed machine tool, in particular a laser cutting or punching flatbed machine tool, for building an intelligent factory with a manufacturing execution system. These methods involve retrofitting a flatbed machine tool with one or more cameras, which are adapted to output image information about a sorting table of the flatbed machine tool to a control unit of the flatbed machine tool for image processing to recognize parts, integrating the one or more cameras into the manufacturing execution system, and adapting the control system and/or the manufacturing execution system to carry out the method disclosed herein for supporting a sorting process of workpieces arranged on the sorting table, whereby the workpieces were produced with a processing plan using the flatbed machine tool.

In a further aspect, the disclosure provides flatbed machine tools, in particular, laser cutting or punching flatbed machine tools, that include a processing unit, in particular a laser cutting or punching processing unit, and a control unit, in which a processing plan is stored, for controlling the processing unit to produce workpieces arranged spatially next to one another in accordance with a processing image data set. Furthermore, the flatbed machine tool includes a sorting table for providing the arranged workpieces for sorting, in particular by the operator, after manufacture, and a detection unit for imaging detection of the sorting table with a plurality of workpieces arranged spatially next to one another and generating at least one first sorting image data set at a first point in time and a second sorting image data set at a second subsequent point in time. The control unit is configured to perform the methods disclosed herein.

In some embodiments, the methods for supporting a sorting process can involve one or more of the following steps:

outputting of a placing signal as a function of the sorting signal for supporting the assignment of the removed workpiece by an operator to a subsequent processing step, in particular for placing the removed workpiece at a workpiece collecting point unit;

monitoring a placing operation of the removed workpiece carried out by an operator, wherein monitoring of a placing operation includes, for example, weight monitoring of a specific workpiece collecting point and/or monitoring of a movement trajectory or part of a movement trajectory of the removed workpiece or of an object causing the movement;

outputting a sorting operation completion signal when the placing operation corresponds to a placing operation associated with the sorting signal, and optionally updating a display specific to a workpiece collecting point with respect to the placing of the removed workpiece;

outputting an error signal when the placing operation differs from a placing operation associated with the sorting signal, and optionally displaying information relating to the placing operation assigned to the sorting signal;

monitoring a placing operation of an operator of at least one removed workpiece in a reject collecting point, and assigning the at least one removed workpiece as a rejected piece and optionally entering the rejected piece in a missing parts list;

outputting a supplementary production signal to a production control system;

comparing the production parameters of the removed workpiece to a subsequent processing plan, and if the production parameters correspond to the subsequent processing plan and there is availability of the removed workpiece, supplementing the subsequent processing plan with a production step to generate a replacement workpiece for the rejected workpiece;

image processing based on a difference image data set generated from the first sorting image data set and the second sorting image data set for position recognition of a change between the first sorting image data set and the second sorting image data set, image processing for recognition of the shape of a removed workpiece, of the shape of the empty remaining area on the sorting table and/or of the shape of the change recognized based on the difference image data set, and/or image processing for a comparing the recognized shape with a shape stored in the processing program, for example as part of the step of comparing the first sorting image data set and the second sorting image data set;

tracking a change in the absolute position of the starting material before or during processing of a starting material in accordance with the processing plan, for example by a zero offset or a coordinate transformation, to adjust the actual position of the machined starting material on the sorting table or the assumed position in accordance with the processing plan;

tracking the movement of outer edges of the starting material, for example, due to a global displacement of the arrangement by a manual intervention of an operator, based on the acquired image data sets; and optically detecting optical image signals in the visible and/or infrared wavelength range and/or sound wave-based detecting of ultrasonic image signals, and processing of the detected optical image signals and/or ultrasonic signals to form the first sorting image data set or the second sorting image data set, for example as part of the step of imaging acquisition of the sorting table.

The individual method steps can be processed so quickly with a processing time, in particular partially in parallel, that the generated sorting signal is generated in less than 0.5 s, e.g., in less than 0.2 s, or in less than 0.1 s after removal of the workpiece. In general, the sorting signal can include sub-signals, each of which is assigned to a removed workpiece if, for example, several workpieces are removed. In addition, signals generally can be output as information on an operator's data glasses and/or a control system's monitoring monitor and/or as flashing signals.

In some embodiments of the flatbed machine tools, the position of a change in the difference image can be determined during the image processing. The image processing generates the difference image, e.g., from successive sorting image data sets. Because a difference image-based analysis is less disturbed by variance of surfaces, incidence of light, perspective, etc., compared to, e.g., classical pattern matching, a higher system tolerance can be achieved. In general, it is therefore advantageous to dispense with classic pattern matching for workpiece identification, because even small deviations can make it difficult to recognize components, especially in shape-based matching. Especially when observing the scene from a lateral perspective, such a classical image processing approach would be difficult, which is why such approaches have probably not yet been implemented, especially in flatbed machine tools. In contrast, the concepts disclosed herein solve such problems.

In some embodiments of the image processing, a change in the absolute position of the sheet geometry that occurred before or during the processing procedure can be taken into account. This can be done, for example, by information provided by the control unit/the Manufacturing Execution System (MES) about a zero point shift and/or coordinate transformation, for example, which is then incorporated into the image processing to adjust the actual position of the initial material in the working area.

In some embodiments of flatbed machine tools, the detection unit is adapted for optically detecting image signals in the visible and/or infrared wavelength range and/or for sound wave-based detecting of ultrasonic image signals, and includes corresponding sensors.

Furthermore, the flatbed machine tool can include a movable workpiece collecting point unit, and optionally a reject collecting point. In addition or alternatively, the flatbed machine tool can include a system for monitoring a placing operation, in particular for monitoring the weight of a specific workpiece collecting point unit, and/or monitoring a movement trajectory or part of a movement trajectory of a removed workpiece or an object causing the movement.

The workpiece collecting point unit can also include a placing area for workpieces generated by the machine tool within a processing plan and a display unit adapted to receive information from the control unit of the machine tool about the placed workpieces and to output it to an operator. The display unit can also receive and output information about the number of stored workpieces, a subsequent processing step, and an underlying order. For example, the display unit is a real display unit, for example, an E-Ink display (also known as an electronic paper display), which is mounted at the placing area, and/or a display unit digitally emulated as part of a control display, for example, as part of a user interface displayed on a tablet.

The concepts disclosed herein and their application in the devices described herein are particularly suitable for reflecting or partially transparent workpieces and can provide advantages in sorting the same. Reflecting or partially transparent workpieces include, for example, workpieces made of sheet metal, glass, semiconductor substrate-structures, printed circuit board-structures and plastic parts, whereby the materials themselves, and in particular their surface properties, can transmit or at least partially reflect light. With such workpieces the recognizability of projected markings can often be inadequate even for larger workpieces, and operators can therefore fall back on paper-based sorting. In contrast, the concepts disclosed herein can increase the efficiency of sorting, especially for such workpieces.

Furthermore the concepts disclosed herein and their application in the devices described herein can have the additional benefit for the operator that he is not bound to a predetermined control procedure according to which he has to sort the parts. For example, experiments with different operators when sorting with and without the use of the concepts disclosed herein have surprisingly shown that sorting is usually faster and more efficient if an operator can follow his own plan regarding the order of sorting and is not tied to an external specification. This can be due, among other things, to the specific circumstances when sorting workpieces produced with flatbed machine tools.

Workpieces produced in this way arrive at the sorting table together with the cut waste, which, for example, is shaped in the form of a residual grid. Due to the separation process, the workpieces can often still be connected to the cut waste (the residual grid) by tiny residual joints (so-called microjoints). When sorting, the operator first separates the workpieces from the rest grid and then sorts them to workpiece-specific trays. If individual workpieces are no longer firmly positioned on the sorting table, or are still connected to the rest grid and thus already hang tiltedly in the rest grid, it can be advantageous for the operator to sort them out first. This procedure applies in particular to bending-resistant workpieces, so that the concepts disclosed herein and their application in the devices described herein can also be particularly suitable for the sorting of bending resistant workpieces. A bending resistant workpiece can be made of sheet metal, glass, or plastic, for example. Furthermore, parts cut (or stamped) from a semiconductor substrate or printed circuit board are often resistant to bending.

In general, a flatbed machine tool can be a laser cutting or punching flatbed machine tool that cuts only by laser or cuts only by punching. Furthermore, a flatbed machine tool can be a combination machine that implements both separation processes. Further processing steps such as deburring, bending, folding, welding, drilling, threading, etc., can also be carried out on the flatbed machine tool.

In general, the workpieces are made of sheet metal, glass, semiconductor substrate-structures, printed circuit board-structures, or plastic parts. The underlying materials have properties that allow imaging with the respective imaging techniques to be used. With regard to optical imaging, the material properties of the workpieces, and in particular their surface properties, can also transmit or at least partially reflect light in the visible and/or infrared wavelength range without the image data acquisition being significantly influenced. Furthermore, the materials usually have a hard surface that is sound and ultrasonic reflective, and enables ultrasonic-based image data acquisition. The laser cutting or punching flatbed machine tools mentioned above are also commonly used to generate workpieces from a solid material having a flexural strength (stiffness) that does not result in significant deformation during rapid manual sorting.

Furthermore, the concepts disclosed herein and their application in the devices described herein are adapted to provide supportive information in real time if possible. Timely provision is important, because the sorting process, the chronological sequence of which is determined by the flow and speed of the manual procedures of the operator, should not be slowed down (e.g., by waiting for a sorting signal) or at least feedback should be given promptly about activities that were performed (e.g., the correct or incorrect associating to a collecting point). Thus, for example, a correct execution of the bookings of the various sorting operations in real time is important for the implementation of the concepts disclosed herein within an intelligent factory. Only for prompt detection, the system can create reasonable suggestions and make them accessible to the operator. The proposed sorting support automatically carries out the important steps such as imaging, comparison, and entering in the MES, for example, in the background. In general, the components and system structures are configured in such a way that the individual method steps are processed with a short processing time, especially partially in parallel. The sorting signal is generated, for example, in less than 0.5 s, in less than 0.2 s, or in less than 0.1 s after the removal of the workpiece.

In some embodiments, when picking up a, e.g., cut part, it is displayed to an operator in which crate (as an example of a workpiece collecting point unit) the part is to be placed. The display can be optical. However, it is also conceivable, for example, to have an acoustic display or acoustic support for an optical display. Thereby, a specific affiliation of a part can be automatically entered in the higher-level system as soon as the placing was performed. If parts are missing, e.g., due to rejects or machine malfunctions, extra production can be initiated directly via an interface to a production control system (MES). The production control system is part of a multi-layered management system for monitoring and performing at least partially automated production. It is integrated in real time, for example, in the execution, control, or monitoring of the production of individual production steps.

The machine tool system includes a camera (or a camera system of several cameras) for the execution of the concepts disclosed herein to be able to capture the entire space of interest. For example, one or more cameras can be permanently installed on the machine housing and provide image information of the sorting table of a flatbed or punch laser cutting machine. After the camera of the camera system has been calibrated on the sheet metal surface/sorting table, an image processing algorithm for part recognition can be used for the procedures disclosed herein. The camera integrated into the method for supporting a sorting process thus makes it possible, for example by image processing, to identify a part gripped by the operator, e.g., on the basis of its shape and/or position on the sorting table. The image processing algorithm can access the order information and, thus, simplifying identification of the parts.

Furthermore, a QR code or a material number, for example, can be engraved with a laser or marking laser during processing. With the help of the camera, this coding can be read and then used for identification and supporting the sorting. As an alternative or as a supplement, an operator can use data glasses that can provide supplementary image information for part recognition and which, in addition to the image of the environment actually perceived, display further information, such as the QR code or a material number, within the field of vision.

By comparing the information obtained from image acquisition and evaluation with the order information, the higher-level sorting system can support workpiece recognition and, for example, identify the intended placing. For example, the tray is marked visibly to the operator on the data glasses and the operator receives feedback as to whether the part has been placed correctly.

With the camera and the comparison of the acquired image information with cutting instructions of the processing plan (e.g., of a cutting program), it can be recognized that a produced workpiece has been removed from the working area monitored by the camera. Via an interface to the MES, one can also determine to which station the part is to be transported next. An optical signal at the workpiece collecting point units, also referred to as load carriers, such as Euro-pallets or transport crates, can be controlled in such a way that it is indicated into which one the part must be placed. Optical signals include specific displays, an activation of specific LEDs, or a projection of information onto the load carrier.

An image monitoring and/or a localizing system and/or a sensor system on the load carrier can detect and check the correct placing. With feedback to the MES, for example, a supplementary post-production can be automatically initiated at the next possible point in time for rejected parts that have been placed at a reject collecting point.

In general, the concepts disclosed herein can enable an increase in process reliability, an optimization of throughput times and, accordingly, a cost optimization of the production. The concepts disclosed herein can lead to a to some extent considerable time saving in the process from the production of the required number of parts to the placing being correct for a subsequent process, avoid errors in the associating, and enable intuitive workflows by, for example, automatic booking of workpieces. Several orders can be reliably processed in one sheet (e.g., sheet metal to be cut) and a cross-order spanning separation of the cut parts for the respective subsequent processes becomes possible. Handling the complexity of multiple orders on one sheet while sorting enables an automatic (cyclic) new common nesting of all open orders.

Thus, a flexible processing of the part removal and a paperless process flow (with the accompanying time saving in the work preparation), an integration of laser cutting machines or punching machines into the semi-automated manufacturing process can be made more efficient. In addition, error prevention and automatic, correct booking can lay the foundation for data-based real-time control of sheet metal production. Accordingly, machines that are used for the production of small batch sizes can also be integrated into a sheet metal production controlled by the MES within the framework of industry 4.0.

Furthermore, the use of mobile handheld devices such as scanners or tablets, which restrict the operator, can be omitted.

DETAILED DESCRIPTION

The aspects described herein are partly based on the realization that in laser cutting or punching flatbed machine tools, the presence of a precise cutting plan in combination with an imaging of the sorting table on which the produced cut material is arranged can be used to support a sorting process and to obtain information suitable for further processing procedures.

The concepts described herein relate to flat sheet metal installations that use punching or laser cutting to produce workpieces for subsequent processing steps from sheets (starting sheets of predetermined thickness and predetermined size). For flatbed machines, a flat shape workpiece can be converted into a freely selectable shape by very flexible sheet metal processing using laser technology. Subsequent bending and welding processes then generate a product. With such laser cutting or punching flatbed machine tools, a processing plan (e.g., cutting plan) is stored as an input parameter in the machine control, wherein the processing plan contains the exact shapes and relative positions of the produced workpieces in relation to each other. In addition to the (cutting) processing plan, one can also use additional information obtained during the processing procedure, such as a coordinate transformation for adapting the (cutting) processing plan to the actual position of the raw sheet. Such information is, for example, stored in the control unit linked to the (cutting) processing plan and, if necessary, also communicated to the Manufacturing Execution System (MES).

Shrinking batch sizes, the need to be able to produce small quantities in short time windows, and individualized products are current challenges for punching or laser cutting; these challenges have a particular impact on the automation of production processes in sheet metal manufacturing companies. The concepts described herein can coordinate and integrate IT-supported processes, especially for smaller batch sizes, assign these to individual machines, and play a role in an adaptable creation of the production plan.

There are high demands of a wide variety of products in intelligent factories ("smart factories"). The potential for more efficient design of manufacturing processes lies in indirect processes, e.g., the steps taking place before and after the separation process. For example, by enabling more efficient and error-free sorting and compensating for rejected workpieces, one can shorten the throughput time of an order across all manufacturing processes and one can achieve a more efficient utilization of the intelligent factory.

Transparent manufacturing planning, in which indirect processes are interlinked, provides an overview of production processes and allows their optimization. The operator becomes a process manager who controls the material flow with his oversight, especially for orders with small batch sizes.

Figure 1:
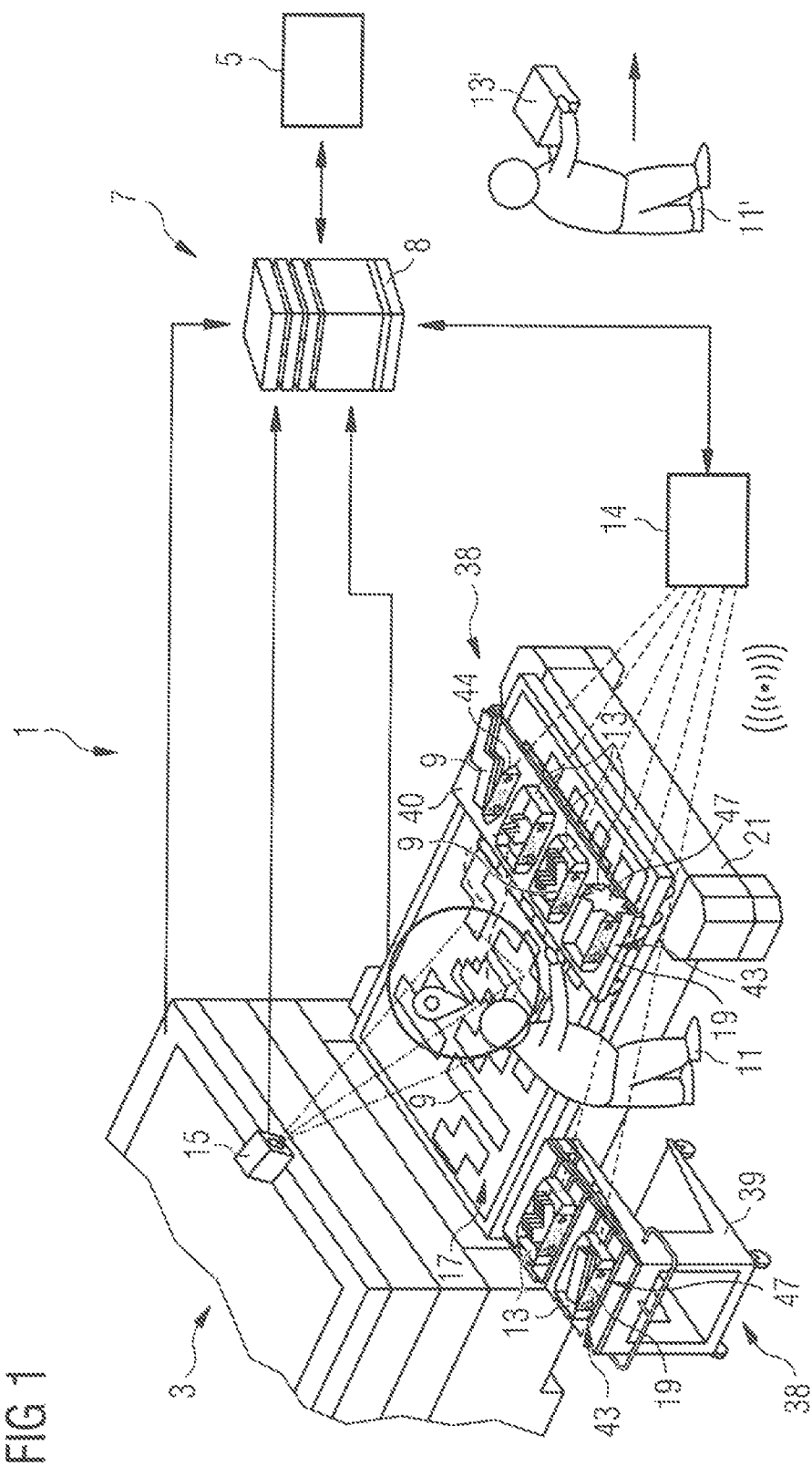
FIG. 1 shows a schematic spatial illustration of a portion of an intelligent factory with a laser cutting or punching flatbed machine tool.

FIG. 1 shows an overview of an intelligent factory 1 ("smart factory") that includes self-adapting production resources, such as a laser cutting or punching flatbed machine 3 shown as an example, and an associated manufacturing execution system (MES) 5. In a network 7, the virtual and physical production elements and production steps, especially the information about workpieces 9 (required number, shape, material, type . . . ) come together in the MES 5. A control unit 8, such as a PC, computing node, or similar suitable hardware, is used to control the flatbed machine 3 and other components assigned to it. The control unit 8 is especially configured to support sorting during real-time operation of the intelligent factory. The underlying computing system includes, for example, digital processor systems with microprocessor circuits having data inputs and control outputs, the processor systems being operated according to computer-readable instructions stored on a computer-readable medium. Typically, the control unit 8 includes high computing power for real-time support and long-term (non-volatile) memory for storing program instructions as well as very fast short-term (volatile) memory for storing captured data and evaluation results during (or resulting from) image data capture and image data processing.

FIG. 1 also shows two sorting devices 38, in the form of a carriage 39, and a bridge 40 that is movable over the sorting table 21. The sorting devices 38 each include several workpiece collecting point units 13. Each workpiece collecting point unit 13 has a display unit 43 with a display 19 and a signal output device 47.

An operator 11 sorts the workpieces 9 taken from a sheet 17 output by the flatbed machine 3 to the workpiece collecting point units 13. After removing the workpieces 9, the corresponding signal output device 47 indicates to the operator in which workpiece collecting point unit 13 he is to place the workpiece 9. The display 19 shows the status (general workpiece information), e.g., the number of stored workpieces 9, how many are still missing, or whether an error has been detected. Furthermore, FIG. 1 shows a combined signal/display unit 44 on bridge 40 that is assigned to large workpieces.

An operator 11, who as an "augmented operator" is provided with comprehensive information in real time, and controls and monitors the manufacturing. As an expert and decision-maker, the operator 11 retains the final decision-maker function in all relevant processes of the production network. Thus, the operator can influence targets situationally and contextually, supported by IT-based assistance systems, such as the method for supporting a sorting process disclosed herein and the workpiece collecting point units 13 disclosed herein.

With regard to production planning, the flatbed machine 3 is a "social machine" that is in contact with other components and is intelligently interlinked with the order control and the MES 5. Thus, for example, it can react to possible deviations in the cutting process independently and depending on the situation.

In traditional manufacturing, an operator would repeatedly pick up work papers relating to orders, manually start orders, sort parts, and associate these to work progress slips and setup plans. This means that the machine can often stand still for long periods of time.

In contrast, interlinked production in the intelligent factory 1 optimizes its indirect processes and provides an overview of the production processes to be carried out. The operator 11 becomes the process manager who keeps track and controls the material flow.

In general, picking up and sorting parts, for example, cut parts, is time-consuming, error-prone, and a great challenge with several orders produced from one blank. With the concepts proposed herein, manufacturing orders for small quantities per batch, for example, can be efficiently sorted for nested parts.

As will be explained in more detail below, the use of an imaging system, e.g., a camera 15 with image processing and an automated localizing of the hand of the operator 11, makes it possible to detect which workpiece 9 was removed from a sheet 17 and output by the flatbed machine 3. At one of the intelligent and interlinked workpiece collecting point units 13, a display 19 can then give a sign and show the operator 11 the sorting location assigned, for example, by the MES 5 (see also steps 63, 65 in FIG. 6). Localizing the hand can also enable the placing operation to be booked in the MES 5. In addition, the workpiece collecting point units, which are designed as intelligent crates, for example, can output current order information received from the MES 5 on, e.g., an e-Ink display. They enable, e.g., an (possibly spatially rough) electrical localization and can enable an intuitive "fine search" for the operator, for example, by flashing. For example, the workpiece collecting point units 13 are connected to their own data supply system 14 that is connected to the MES 5 and the control unit 8 for data exchange.

After a number of required workpieces have been sorted into a workpiece collecting point unit 13', an operator 11' (or automated robot system) takes the workpiece collecting point unit 13' to a subsequent processing step.

An electronic assistant supports the operator 11 on the information side by providing situational information. This allows the operator 11 to continue implementing individual preferences (such as where do I start, do I create small hand buffers or not . . . ) in the sorting process. Steps include observing, evaluating, and providing the information required for the situation.

Figure 2:
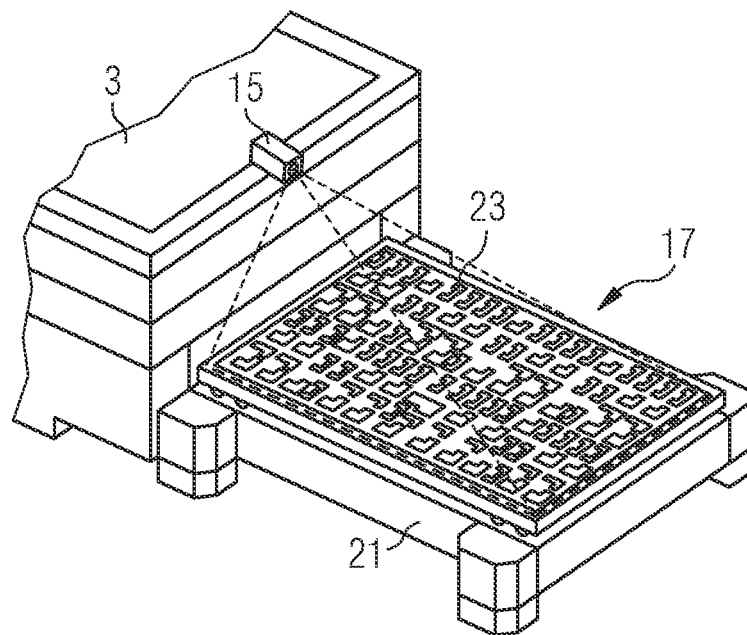
FIG. 2 shows a schematic spatial illustration of an example of an arrangement for the imaging detection of a sorting image data set.
Figure 3:
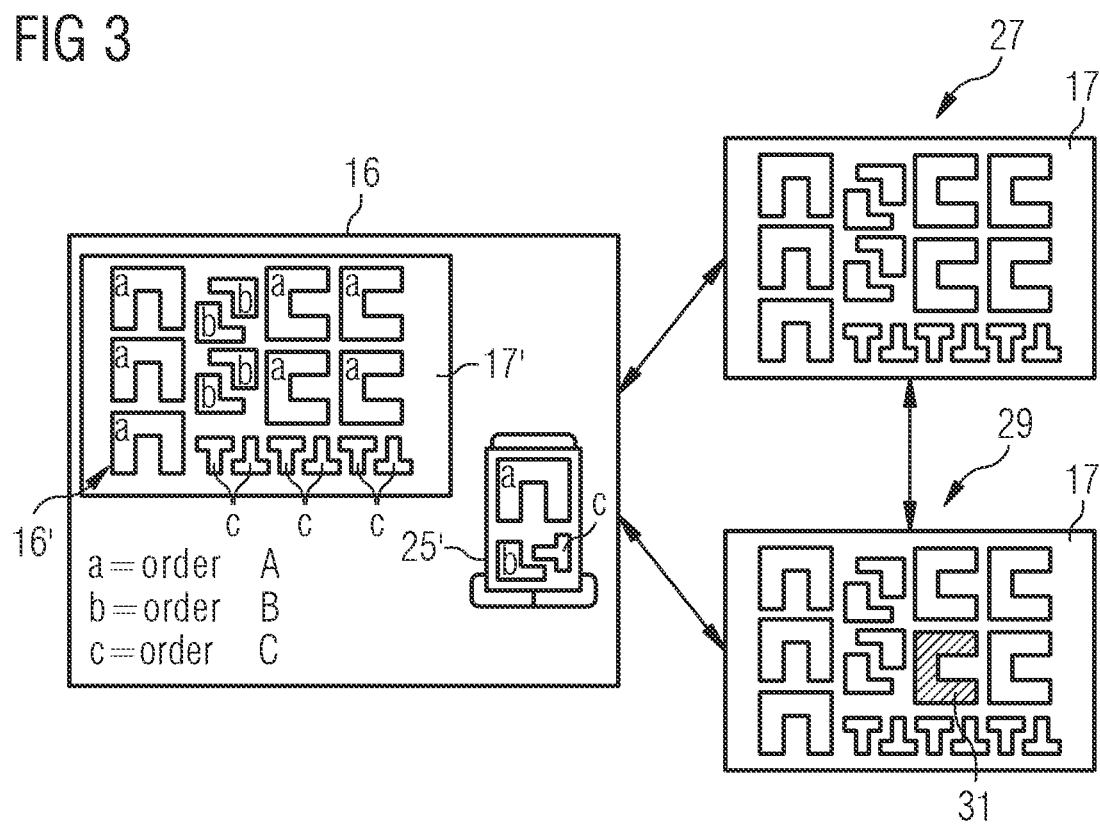
FIG. 3 shows schematic illustrations of an example of a processing image data set of a processing plan and two detected sorting image data sets.
Figure 6:
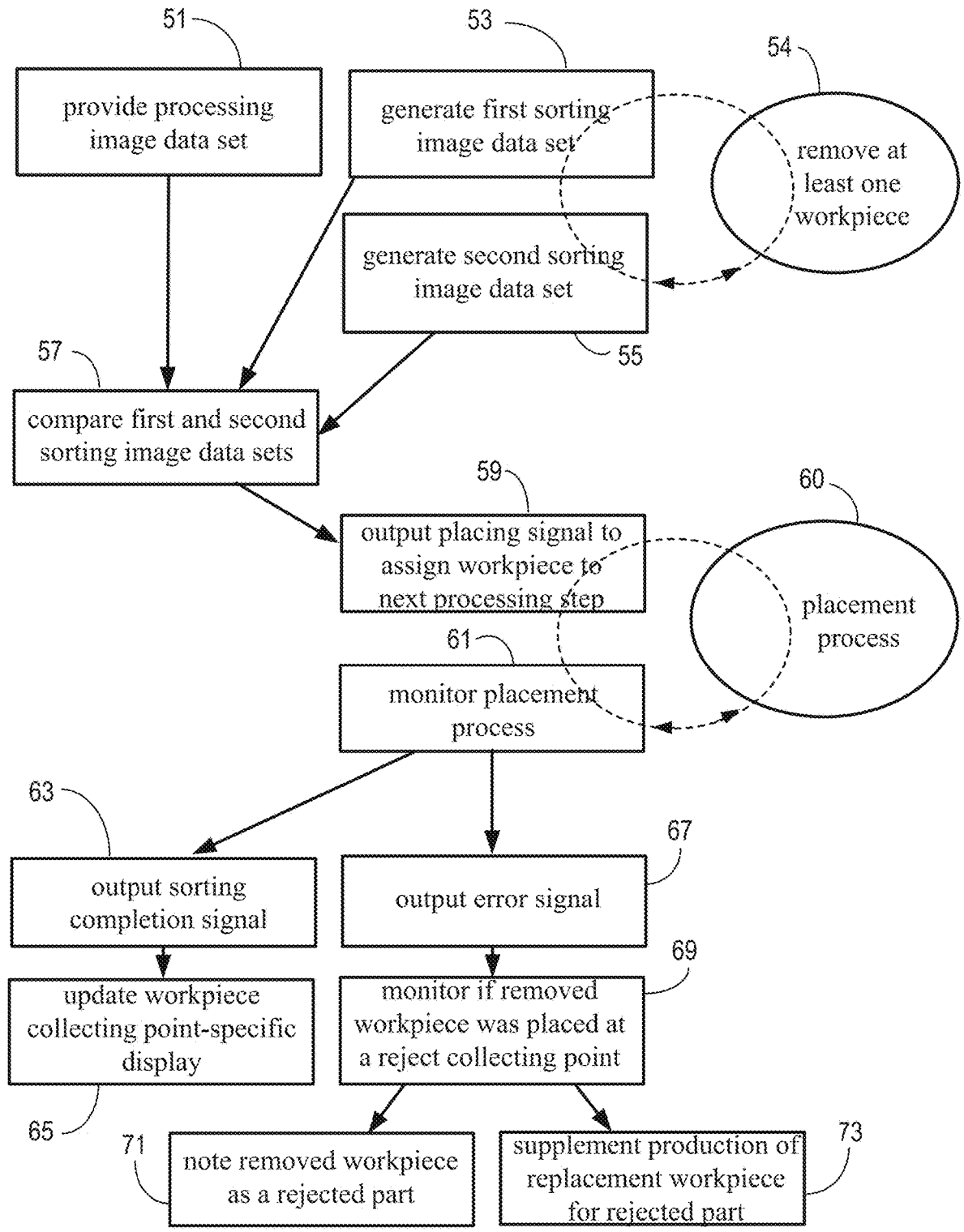
FIG. 6 shows a flow chart for illustration of an exemplary process flow in the support of a sorting process.

FIGS. 2 and 3 show exemplarily how a sorting image data set is obtained with a camera system including the camera 15 for imaging detection and processing (see also steps 53, 55, 57 in FIG. 6). To detect removed parts, the camera 15 detects the sorting table 21 of the flatbed machine 3, and in particular the working space 23 above the already-processed sheet that is to be sorted. The sorting is carried out by an operator 11, in the exemplary embodiment in the form of a living human being (not a robot). To determine the position of the, e.g., cut sheet on the pallet, the camera 15 is calibrated to the machine coordinates. The camera 15 is part of an imaging system that, for example, optically records an image of the sorting table 21 with the parts to be sorted in the visible and/or infrared wavelength range and/or with sound waves such as ultrasonic waves. Accordingly, the camera includes a sensor system for recording image signals in the wavelength ranges. The imaging system includes an image processing unit for generating the image from the image signals.

The control unit 8 with interface to the camera 15 and to the flatbed machine 3 uses suitable image processing methods (e.g., difference image generation) to detect when a workpiece 9 is removed from the sorting table 21. The software uses the interface to the flatbed machine 3 to reconstruct the layout on the sheet 17 and the contours of, e.g., cut workpieces 9 from the processing program.

FIG. 3 shows schematically a processing plan 16 with a processing image data set 16' that was the basis for the arrangement of at least one workpiece 9 on the sorting table 21 (see also step 51 in FIG. 6). There are exemplarily planned shaped parts in three types a, b, c on a schematic sheet 17'; the shaped parts are assigned to three orders A, B, C. It can also be seen that the shaped parts produced are to be sorted into three stacks according to the types a, b, c on a carriage 25' as workpiece collecting point units.

FIG. 3 also schematically shows a first camera image 27 of the sheet 17 with the shaped parts cut out of the sheet 17, the image being captured at a first point in time immediately after the cutting process; that is before the first removal of a shaped part. Another camera image 29 shows the sheet 17 after the first removal of a shaped part a (dotted area 31 in FIG. 3) at a second point in time (after the first point in time).

By continuously generating a difference image, for example between the real camera image and a reference image, a change can be detected that indicates a removed workpiece. A comparison with, for example, a virtual superposition of the processing image data set of the CNC program or of a type of a shaped part can then identify the removed workpiece. Thereby, one can clearly identify when a part has been removed and which part was removed. The reference image can be updated with the new scene after each removed part.

The comparison can also be carried out by tracking the absolute position of the sheet with the workpieces cut out. This can be done, for example, by additionally detecting the outer edges of the blank sheet. Tracking allows compensation for a global displacement of the arrangement, e.g., by the manual intervention of the operator.

Furthermore, the flatbed machine 3 can have a laser system for engraving workpiece-specific QR codes or material numbers (e.g., an additional marking laser or a correspondingly adjustable cutting laser). If a workpiece has been provided with a QR code or a material number during processing, the camera system can then additionally recognize and read out this coding. This can allow a workpiece to be assigned more quickly, e.g., as workpieces that are assigned in the processing plan and are to be generated, and/or to further processing steps stored in the MES 5.

To inform the operator 11 about what is to happen next with the removed part (it is classically placed in a crate at workpiece collecting point unit 13 for further transport), the control unit 8 is in communication with the MES 5. Not only the next location (in which crate the part must be placed), but also other information such as material, order number, customer, etc., is stored therein.

The workpiece collecting point units 13 also have a communication interface to the control unit 8 and can output information on the order, e.g., via an E-Ink display as display 19. Via the interface, the workpiece collecting point units 13 are thus also in a position to indicate to the operator 11, who is picking up a workpiece 9, in which crate he is to place it (see also step 59 in FIG. 6). A built-in scale or another suitable sensor unit can be used to determine whether the operator 11 has placed the workpiece 9 in the correct crate (see also step 61 in FIG. 6). Accordingly, feedback can be sent, e.g., via a counter on the E-Ink display. Thus, in control unit 8, a determination can be made as to whether all parts have been sorted correctly or whether parts of the order are missing that, for example, have fallen through the residual grid.

It is also conceivable that the operator 11 recognizes a faulty part during sorting and places it in a collecting point provided for rejects (see also step 69 in FIG. 6). In another case, the flatbed machine 3 automatically records faulty cuts, manual operator interventions or even collisions during sheet processing and records the affected parts as rejects via the interface to the control unit 8. For such cases, an order for the post-production of the identified rejects can be automatically created in the MES 5 and planned (see also step 73 in FIG. 6).

By extending the system with an interior localization and interfaces to the control unit 8, the positions of the workpiece collecting point units can further be determined and/or the movement of the hand of the operator 11 can be detected. Such a localizing can be done, e.g., via an ultra-wideband system of four or more so-called "anchors" and one or more "tags". The anchors serve as receivers and can be positioned and stationary around the working area 23. The tags are attached to all workpiece collecting point units and the hand of the operator 11, and are used to determine their position. Further interior localizing systems include Bluetooth, Wi-Fi, infrared and RFID, for example.

Figure 4:
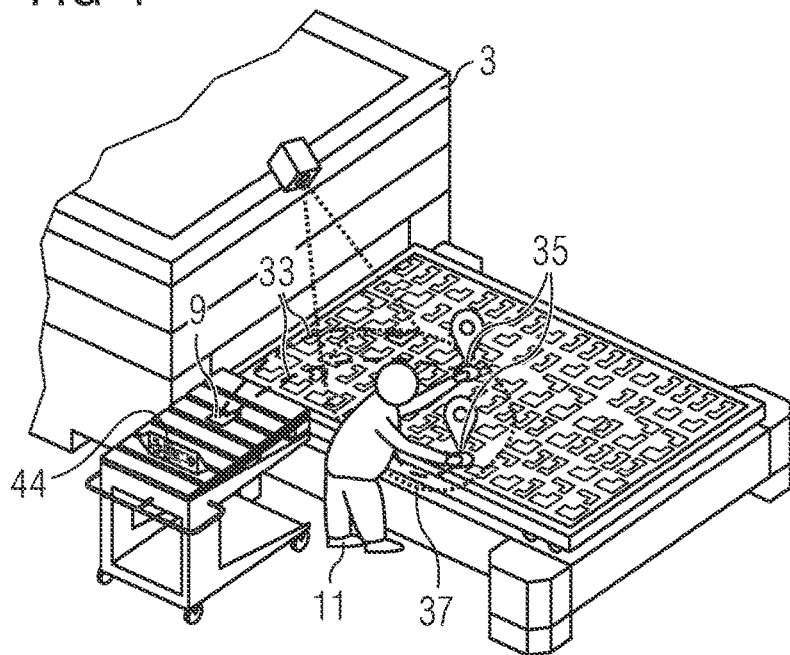
FIG. 4 shows a schematic spatial illustration of an exemplary monitoring of a placement procedure of a removed workpiece.

As shown in FIG. 4, tracking the hand of the operator 11 can determine whether the workpieces 9 were placed in the correct crates. As an example, movement trajectories 33 of the hand when removing a workpiece 9 are shown in FIG. 4. Furthermore, the tracking information can be used to improve the procedure for detecting a part that has been removed. By localizing the hand (e.g., positions 35), its motion trajectory or a part of the motion trajectory, a region of interest 37 is defined in the image area. The image processing does not have to search the entire workspace 23 for changes in each calculation step, but only the region of interest 37 around the hand of the operator 11. If several operators 11 work during the sorting process, a region of interest 37 can be defined simultaneously for each operator 11 at the sorting table 21. Each operator 11 can thus be provided with individual information on the correct placing location of the workpiece.

In addition to the previously mentioned approach of executing the logic and computing power in a central computing node (control unit), other known topologies can be used for linking flatbed machine 3, camera 15 (generally an imaging system), crates with workpiece collecting points 13, MES 5, and localizing systems.

In addition, the function of displaying data at the storage location and the control of the placing can be performed with data glasses. Such "augmented reality" glasses can be used to display not only the location of the correct placing location but also its target height. For example, Hololens® data glasses can be used to display holographic 3D objects at a fixed location. Thereby, the operator 11 can easily check whether a stack of workpieces is complete.

In further embodiments that use data glasses, the parts are visible to the operator 11 after part generation in a residual grid-parts-group. Via the control unit 8 and the MES 5, it is known which part is at which position in this group and where it is to be placed. With the data glasses, the operator 11 receives a feedback as to whether the part was successfully detected or a proposal for a retry strategy.

One can also suggest to the operator 11 an optimal sorting strategy via the projection screen of the data glasses, even if he can still sort according to a self-chosen strategy. With many small parts, for example, one can suggest to the operator to remove several identical parts at the same time. Using an algorithm, it is possible to calculate and display in real time how many parts can be removed at a time, depending on the size and weight of the individual parts, for example. This can also be individually adjustable depending on the operator. Furthermore, if the operator 11 has picked up a shaped part of type a, the position of other parts of the same type, for example along a favorable movement trajectory, can be displayed to the operator 11. This can, for example, avoid unnecessary paths.

After a removed part has been successfully read in, the control unit 8 as a control system outputs the correct placing location to the operator 11, e.g., via the projection screen of the data glasses. This could be, for example, a numbered storage compartment. If the storage compartment is at a more distant location, the projection surface of the data glasses can be used to refer via a map to the storage area. The supporting camera of the data glasses can also recognize the storage compartment as soon as it is within the visible area and mark it on the projection surface.

The control system also monitors whether the part has been placed in the correct compartment during the placing procedure and provides feedback to the operator 11 via the projection surface of the glasses. Various data glasses available on the market that ideally have their own GPS coordinate system or can be coupled to an external positioning system, can thus be integrated into the systems proposed herein.

Figure 5:
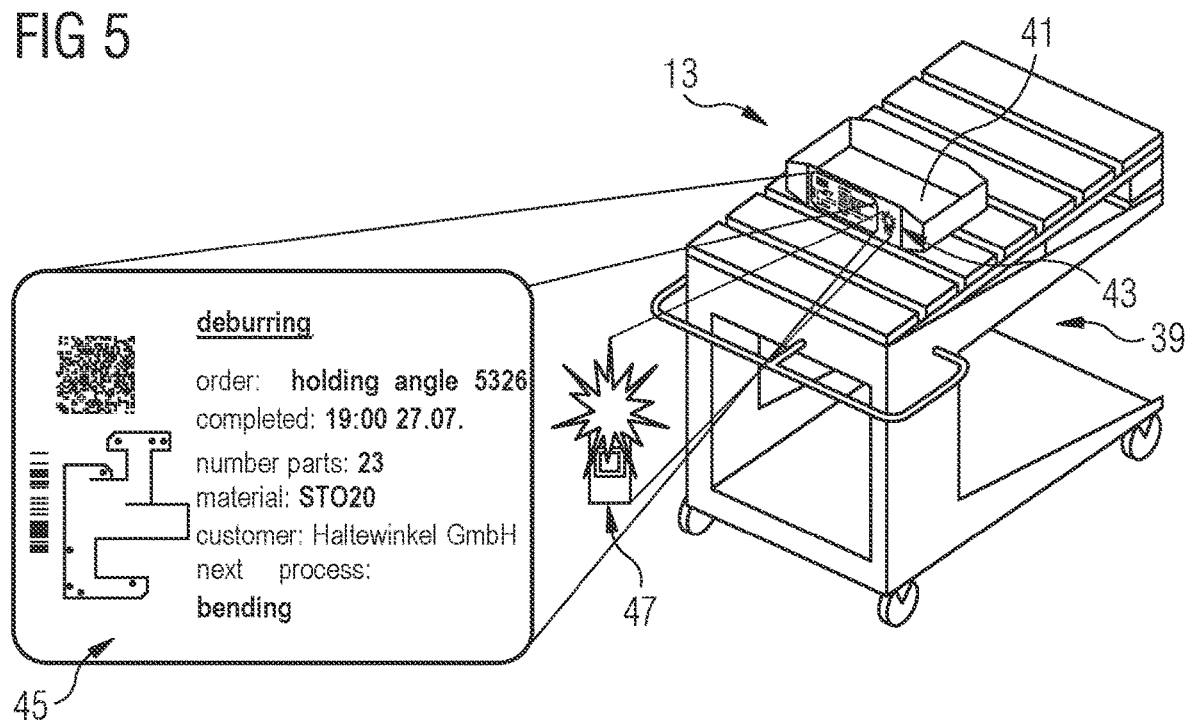
FIG. 5 shows a schematic spatial illustration of an example of a workpiece collecting point unit.

FIG. 5 shows a workpiece collecting point unit 13 on a carriage 39. The workpiece collecting point unit 13 includes a placing area 41 for workpieces 9 generated by a machine tool as part of a processing plan. The workpiece collecting point unit 13 also has a display unit 43 configured to receive from, for example, the control unit 8 of the machine tool, information 45 about the workpieces placed at the workpiece collecting point unit 13, and to output the information to an operator.

For example, display unit 43 is configured to receive and output information on the number of placed workpieces 9, missing workpieces, a subsequent processing step, an underlying order (customer), target material, and so on.

The display unit 43 can be a real display unit, for example an E-Ink display, attached to the carriage 39. Alternatively or in addition, a digitally emulated display unit can be used within a control representation, for example, within a user interface displayed on a tablet, for example.

In addition to E-Ink displays, display data and crate feedback can also be provided by activating a signal emitting device, such as one or more LEDs, an active LCD display, an acoustic signal source, or by projection with a beamer or laser scanner, when a placed part is detected. In addition, (supplementary) control measurements of the correct placement with a scale, a height measurement of a stack (optical measurement methods, such as laser scanners), or an image-based control (camera counting systems) can be used. A vibration sensor (e.g., an acceleration sensor) can also be used (in addition). Generally, the signal output device 47 is adapted to output feedback signals to an operator. Furthermore, the display unit 43 and the signal output device 47 can be combined in one unit. Combined signal/display units are used in the frame of the communication system disclosed herein and—together with mobile workpiece collecting units—enable retrofitting of installations of flatbed machine tools to intelligent factories.

FIG. 6 shows a flow chart to illustrate exemplary method procedures in the support of a sorting process. It is assumed that workpieces arranged on a sorting table have been produced with a flatbed machine tool, in particular a laser cutting or punching flatbed machine tool as described above, based on a processing plan.

In control unit 8, a processing image data set of the processing plan (see, e.g., the processing image data set 16' in FIG. 3) is provided (step 51) that was the basis for the arrangement of the generated workpieces. Furthermore, the sorting table is imaged with the plurality of workpieces arranged spatially one next to the other, e.g., optically in the visible or infrared wavelength range, or with sound waves, or ultrasonic waves, to generate a first sorting image data set (see, e.g., the first camera image 27 in FIG. 3) (step 53).

This is followed by a removal of at least one workpiece from the sorting table (step 54) and a repetition of the imaging acquisition of the sorting table based on which a second sorting image data set is generated (step 55).

Now the first and the second sorting image data sets are compared (step 57) with the processing image data set—for example with an image processing algorithm—to generate a sorting signal. The sorting signal includes information about the type, position, and/or shape, and optionally can include localizing information of at least one removed workpiece. The sorting signal can also indicate whether and how to proceed with the at least one removed workpiece. The sorting signal can be transmitted to the control unit 8 and/or to the MES 5 and can trigger downstream processes.

The comparison of the first sorting image data set and the second sorting image data set can include image processing to detect the shape of a removed workpiece or the shape of the area left blank on the sorting table, and/or image processing to compare the detected shape with a shape stored in the processing program.

Furthermore, a placing signal can be output as a function of the sorting signal to support the assignment of the removed workpiece by an operator to a subsequent processing step (step 59). For example, a placing of the removed workpiece according to an order is prompted at a workpiece collecting point corresponding to the order. This can include, for example, a flashing of an associated crate, a special displaying on a display associated with the crate, and/or the blending in of a marking of the associated crate into a display of data glasses.

A placement process (step 60) of the removed workpiece carried out by an operator can be monitored (step 61). Monitoring the placing operation includes, for example, monitoring the weight of a specific workpiece collecting point and/or monitoring a motion trajectory or a part of a motion trajectory of the removed workpiece or an object causing the movement (see, e.g., FIG. 4).

If the placing operation corresponds to a placing operation associated with the sorting signal, a sorting completion signal can be output (step 63), e.g., again by a flashing signal, special outputs on a display of, e.g., the workpiece collecting point unit, and/or a marking in the display of the data glasses. For example, a workpiece collecting point-specific display can be updated with regard to the placing of the removed workpiece (step 65).

If the placing operation deviates from a placing operation associated with the sorting signal, an error signal can be output (step 67), for example again by a flashing signal at the workpiece collecting point unit, special outputs on a display at the workpiece collecting point unit, and/or a marking in the display of the data glasses. Information regarding the correct placing operation assigned to the sorting signal can also be displayed repeatedly at the same time.

In addition, it can be monitored, for example, whether at least one removed workpiece was placed by an operator at a reject collecting point during a placing operation (step 69). The removed workpiece can be noted by the MES 5 as a rejected part, e.g., optionally entered in a list of missing parts (step 71).

A supplementary production signal can be output to a production control system for detected rejected parts. Here, for example, the production parameters of the removed workpiece are compared with a subsequent processing plan. If the production parameters correspond to the following processing plan and if a new production of the removed workpiece is available, the following processing plan can be supplemented with a production step for the production of a replacement workpiece for the rejected part (step 73). The generation of a replacement workpiece can also be provided for in later subsequent processing plans.

As indicated by dashed paths in FIG. 6, various steps of the method can be repeated to ensure continuous real-time monitoring and support of the sorting operation.

The disclosed workpiece collecting point unit 13, the flatbed machine tool 3, the communication system, and/or the method can also be used for workpieces 9 and/or shaped parts a, b, c with more than four corners and/or more than four edges.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

Other Embodiments

A number of embodiments of the invention have been described. Nevertheless, it will be understood that various modifications may be made without departing from the spirit and scope of the invention. Accordingly, other embodiments are within the scope of the following claims.

What is claimed is:

1. A method for supporting a sorting process of workpieces arranged on a sorting table, wherein the workpieces have been produced with a processing plan using a flatbed machine tool, the method comprising:
providing a processing image data set for the arrangement of workpieces on the sorting table, wherein the arrangement of the workpieces in the processing image data set is defined by the processing plan;
imaging the sorting table with a plurality of workpieces arranged next to one another to generate a first sorting image data set;
imaging the sorting table after at least one workpiece of the plurality of workpieces arranged next to one another has been removed from the sorting table to generate a second sorting image data set;
comparing the first sorting image data set, the second sorting image data set, and the processing image data set; and
generating a sorting signal containing information including a type, location, and/or a shape of the at least one removed workpiece based on the comparing step.

2. The method of claim 1, further comprising outputting a placing signal as a function of the sorting signal, wherein the placing signal indicates to an operator an assignment of the removed workpiece for a subsequent processing step.

3. The method of claim 2, wherein the placing signal assists the operator in placing the removed workpiece at a workpiece collecting point unit.

4. The method of claim 1, further comprising monitoring a placing operation of the removed workpiece.

5. The method of claim 4, wherein monitoring the placing operation comprises monitoring a weight of a specific workpiece collecting point, or monitoring at least a part of a movement trajectory of the removed workpiece or of an object effecting the movement.

6. The method of claim 4, further comprising outputting a sorting operation completion signal when the placing operation corresponds to a placing operation associated with the sorting signal.

7. The method of claim 4, further comprising updating a display of the workpiece collecting point unit after the removed workpiece has been correctly placed in the workpiece collecting point unit.

8. The method of claim 4, further comprising outputting an error signal when the placing operation differs from a placing operation associated with the sorting signal.

9. The method of claim 4, further comprising displaying information about the placing operation based on the sorting signal.

10. The method of claim 1, further comprising:
monitoring a placing operation of at least one removed workpiece to a reject collecting point by an operator; and
labelling the at least one removed workpiece as a rejected workpiece.

11. The method of claim 10, further comprising entering the rejected workpiece in a list of erroneous parts.

12. The method of claim 10, further comprising:
comparing production parameters of the removed workpiece with a subsequent processing plan; and
when the production parameters correspond to the subsequent processing plan and there is an availability with respect to the removed workpiece, supplementing the subsequent processing plan with a production step for producing a replacement workpiece for the rejected workpiece.

13. The method of claim 1, wherein comparing the first sorting image data set and the second sorting image data set comprises
performing image processing based on a difference between the image data set generated from the first sorting image data set and the second sorting image data set, and recognizing a change between the first sorting image data set and the second sorting image data set.

14. The method of claim 1, wherein comparing the first sorting image data set and the second sorting image data set comprises performing image processing for recognizing a shape of a removed workpiece, a shape of an empty remaining area on the sorting table, and/or a shape of a change between the first sorting image data set and the second sorting image data set.

15. The method of claim 14, wherein comparing the first sorting image data set and the second sorting image data set comprises performing image processing for comparing a recognized shape with a corresponding shape stored in the processing plan.

16. The method of claim 1, wherein imaging the sorting table comprises:
optically detecting optical image signals and/or ultrasonic image signals; and
processing the detected optical image signals and/or ultrasonic signals into the first sorting image data set or the second sorting image data set.

17. The method of claim 1, wherein the individual method steps are processed with a processing time such that the generated sorting signal is generated in less than 0.5 s after the removal of the workpiece.

18. A flatbed machine tool comprising:
a processing unit;
a control unit, in which a processing plan is stored for controlling the processing unit to generate workpieces arranged next to one another in accordance with a processing image data set;
a sorting table for the arranged workpieces for sorting after manufacture; and
a detection unit for imaging the sorting table with the workpieces arranged next to one another and generating at least one first sorting image data set at a first point in time and a second sorting image data set at a second subsequent point in time,
wherein the control unit is adapted to perform a method, comprising:
providing a processing image data set for the arrangement of workpieces on the sorting table, wherein the arrangement of the workpieces in the processing image data set is defined by the processing plan;
imaging the sorting table with a plurality of workpieces arranged next to one another to generate the first sorting image data set;
imaging the sorting table after at least one workpiece of the plurality of workpieces arranged next to one another has been removed from the sorting table to generate the second sorting image data set;

comparing the first sorting image data set, the second sorting image data set, and the processing image data set; and generating a sorting signal containing information including a type, location, and/or the shape of the at least one removed workpiece based on the comparing step.

19. The flatbed machine tool of claim 18, wherein the detection unit comprises sensors for optically detecting image signals, and/or ultrasonic image signals.

20. The flatbed machine tool of claim 18, further comprising:

at least one movable workpiece collecting point unit; and a system for monitoring a placing operation of a specific workpiece collecting point unit, and monitoring at least a part of a movement trajectory of a removed workpiece or of an object effecting the movement.

21. The flatbed machine tool of claim 20, further comprising a reject collecting point.

22. The flatbed machine tool of claim 20, wherein the system for monitoring a placing operation is further configured for monitoring a change in weight of a workpiece collecting point unit.

23. The flatbed machine tool of claim 20, wherein the workpiece collecting point unit comprises:

a placing area for workpieces produced by the flatbed machine tool; and a display unit adapted to receive information about the placed workpieces from the control unit to assist in placing the workpieces, wherein the display unit outputs the information to an operator.

24. The flatbed machine tool of claim 23, wherein the display unit of the workpiece collecting unit is further adapted to receive and output information about a number of placed workpieces, a subsequent processing step, and an underlying order.

25. A method for retrofitting a flatbed machine tool installation with at least one flatbed machine tool for building an intelligent factory with a manufacturing execution system, the method comprising:

retrofitting a flatbed machine tool with one or more cameras adapted to output image information about a sorting table of the flatbed machine tool to a control unit of the flatbed machine tool for image processing for part recognition;

integrating one or more cameras into the manufacturing execution system; and adapting the control unit and/or the manufacturing execution system to carry out the method of supporting a sorting operation of workpieces arranged on the sorting table and produced with the flatbed machine tool, the method comprising:

providing a processing image data set for the arrangement of workpieces on the sorting table, wherein the arrangement of the workpieces in the processing image data set is defined by the processing plan;

imaging the sorting table with a plurality of workpieces arranged next to one another to generate a first sorting image data set;

imaging the sorting table after at least one workpiece of the plurality of workpieces arranged next to one another has been removed from the sorting table to generate the second sorting image data set;

comparing a first sorting image data set, the second sorting image data set, and the processing image data set; and generating a sorting signal containing information including a type, location, and/or the shape of the at least one removed workpiece based on the comparing step.

* * * * *